L. V. & S. R. SIKES.  
Sulky-Drag.

No. 219,774. Patented Sept. 16, 1879.

Witnesses:  
Floyd Norris  
Alex. Scott

Inventors:  
L. V. Sikes  
S. R. Sikes  
by Johnson & Johnson  
Attys

2 Sheets—Sheet 2.

L. V. & S. R. SIKES.
Sulky-Drag.

No. 219,774. Patented Sept. 16, 1879.

Witnesses:
Floyd Norris
Alx. Scott

Inventors:
L. V. Sikes,
S. R. Sikes,
by Johnson & Johnson
Attys

UNITED STATES PATENT OFFICE.

LADORE V. SIKES AND STILLMAN R. SIKES, OF EAST OTTO, NEW YORK.

IMPROVEMENT IN SULKY-DRAGS.

Specification forming part of Letters Patent No. 219,774, dated September 16, 1879; application filed July 28, 1879.

*To all whom it may concern:*

Be it known that we, LADORE V. SIKES and STILLMAN R. SIKES, both of East Otto, in the county of Cattaraugus and State of New York, have jointly invented certain new and useful Improvements in Sulky-Drags; and we do hereby declare that the following is a full, clear, and exact description of the invention, which will enable others skilled in the art to which it appertains to make and use the same, reference being had to the accompanying drawings, and to the letters of reference marked thereon, which form a part of this specification.

The invention relates to improvements in harrows and sulky-drags.

The object of our invention is to produce a sulky-drag that shall exhibit in a superlative degree all the advantages of supporting the frame and of capacity to guide and raise the drag from the ground, and to have, in addition, an advantageous and novel construction of the harrow or drag-bar part, rendering it capable of overcoming any inequality of ground without departing from its steady dragging movement, so that any row of teeth may bear upon and ride over stones or inequalities without lifting the other rows of drag-teeth.

To this end we have produced the construction hereinafter particularly described and claimed.

Figure 1:
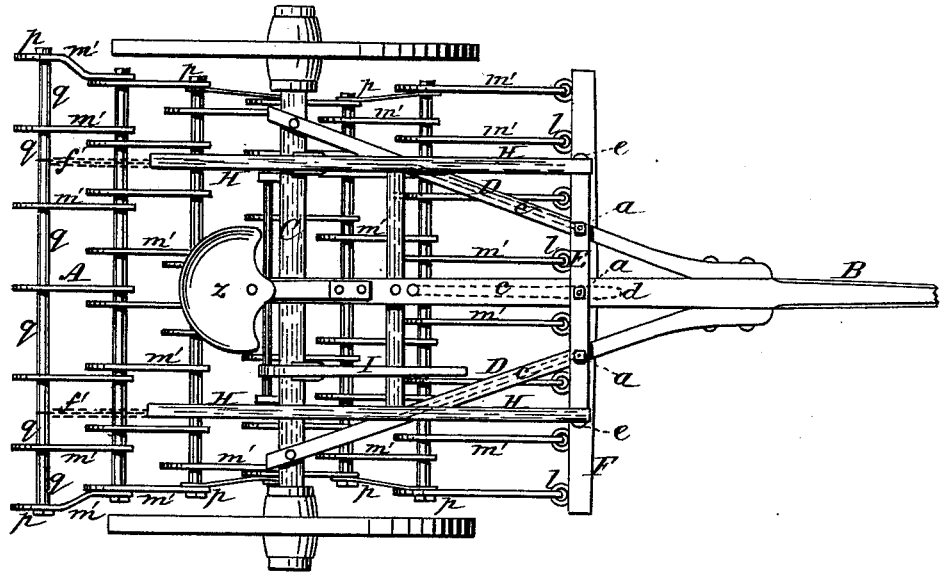
Figure 2:
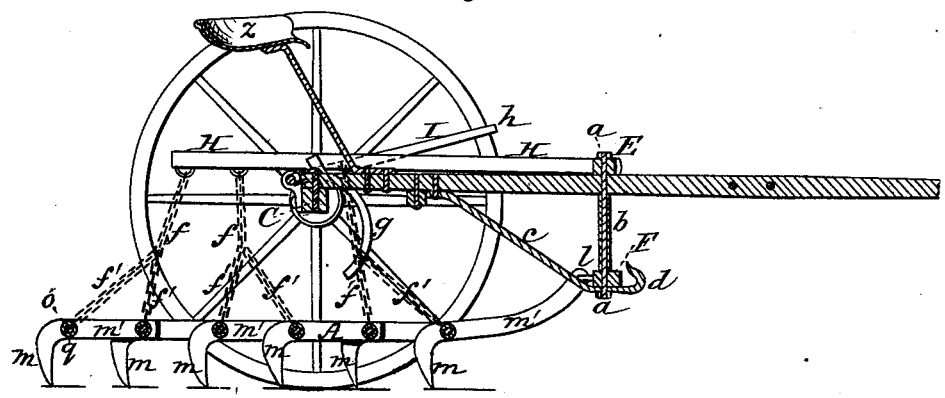
Figure 3:
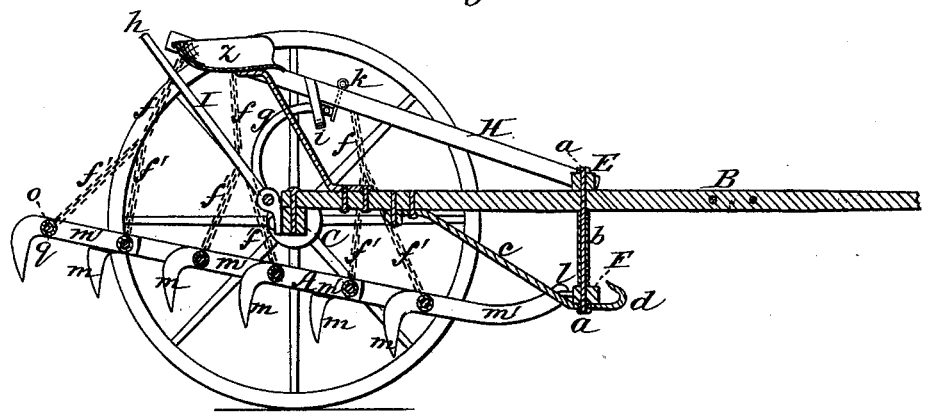
Figure 4:
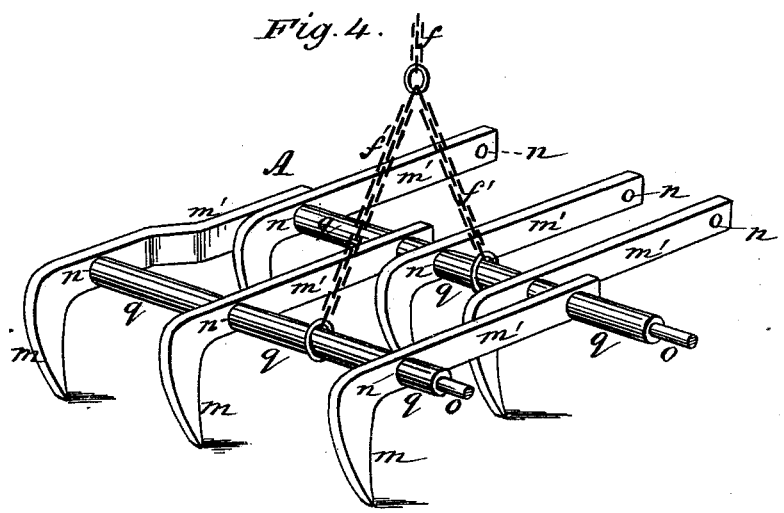

In the accompanying drawings, Figure 1 represents a top view of a sulky-drag embracing our invention; Fig. 2, a vertical longitudinal section with the harrow lowered upon the ground as in action; Fig. 3, a vertical longitudinal section with the harrow raised and out of action; and Fig. 4, a detail of the harrow-teeth, showing the manner of arranging the flexible net-work of drag-teeth.

The sulky, which carries the drag A beneath it, is drawn by a pole, B, fastened itself to the axle C, and braced by hounds D; and upon this pole, a sufficient distance in front of the wheels, there is a cross-bar, E, fastened to the pole and hounds by rods $a\ a\ a$, secured by nuts at the top, and passing down through said parts, and supporting a front cross-piece, F, directly below the cross-bar E, which rods are embraced by pipe-sleeves $b$, which act as supporting-binders. These rods $a$ are also secured by nuts underneath the cross-piece. This cross-piece F acts as a draft attachment for all the lines and rows of teeth $m$, and for the whole flexible net-work of drags, while the pole serves to guide the drag and keep it steady and straight.

Brace-rods $c\ c\ c$, passing from cross-piece F in an inclined direction backward to hounds and pole, and properly fastened, add to the security of position and bracing capacity of the cross-piece, which carries the whole of the drag. Said rods $c$ also brace and support the sulky-frame and concentrate the point of draft upon the axle.

To the cross-piece F there is attached a central hook, $d$, for the whiffletree-connection. Said hook is a continuation of the middle brace-rod, $c$, above described, so that the strain of draft is evenly distributed.

At each end of the cross-bar E are pivot-pins $e$, Fig. 1, upon which side arms, H H, are capable of being swung by the action of a lever, I, fulcrumed on the axle, as below set forth.

Depending from the arms H are chains or cords $f\ f\ f$, having branches $f'\ f'\ f'$ attached to each of the rods of the drag, whereby the said drag may be lifted and held or lowered and raised at will. By means of the branching chains all the rods, with the rows of drag-teeth they carry, are lifted simultaneously to pass over stumps or large stones, or lifted and held in passing to and from the field.

The lever I has two frontwardly-curving arms, $g\ g$, at each end, which lift the side arms, H H, as the lever-handle $h$ is raised. These arms $g$ are confined to their bearing against the lifting side arms, H H, by hanging loops $i\ i$, as shown in Fig. 3, and when the drag is not in action stop-pins $k\ k$ are inserted through said arms H in front of the lever-arms $g$, and thus keep the drag from the ground in passing to and from the field. However, any suitable device might be substituted for this purpose.

An important part of our invention consists in the flexible net-work of independently-operating rows of drag-teeth of peculiar form and arrangement. Beginning at the cross-piece F and projecting toward the rear, the first or front row of teeth are fastened by swivel-hinges $l\ l$, so as to have an easy connection and carry each line of drag-teeth in connection with their rods direct from said cross-piece. All the draft-strain is distributed between the cross-piece F and the sulky-frame, and there is a perfect flexible connection of the drag parts throughout. These drag-bar teeth $m$ are made of strap-bars $m'$, bent at about a right angle, (or hook-shaped at one end,) to form the raking ends or points shown.

At about the bend of each tooth is a hole, $n$, through which a connecting-rod, $o$, passes to string them together, which rod is secured by nuts $p$ on the outside of the end teeth. The teeth-bars are kept equidistant by sleeves $q$, made by cutting pipe into suitable lengths. All the rows of teeth are made the same way, except that the front row has but one hole, $n$, and is strung upon two rods instead of one, for the obvious reason that two connecting-rods must pass through each tooth—one at the straight or bar end, and the other near the bend. The second row of teeth is arranged each tooth between two teeth of the front row, breaking joints for all the series of rows in a manner to preserve the desired and well-known harrow-track. About six rows will make a full and perfect drag.

The sleeves $q$ are in longer and shorter sections, as shown, and the teeth are thereby all kept in proper position. Thus each row of teeth has a perfectly free swinging movement upon its own connecting-rod, and, unlike a gang of harrows, each row may rest upon and pass over any inequality of ground without lifting the others. Besides this, the construction described permits of a vertical flexure to pass inequalities under one side or part of the drag.

It will be seen that the drag is in rigid connection with the pole, which latter serves only as a steadying-guide and as an aid to the team, and it therefore runs steadily without bouncing—a thing unavoidable in most drags—and the teeth are so arranged that they will drag as well upon the outer sides as in the center, and lapping is unnecessary.

In passing over stones the weight of the whole drag does not rest on the individual teeth which happen to be on the stone, as is commonly the case with harrows, because each connecting-rod acts as a hinge, and its pipe-sections as lateral braces.

The front row of teeth-drags are longer than the others, and their shank ends are curved upward to the hinge-connection.

The driver's seat Z is mounted upon the pole over the axle. The pole gives better management of the team with a separate draft-connection below the line of the draft, and prevents the drag from flopping around.

The construction and connection of the drag-teeth render the draft comparatively light, especially on stony ground, for each cross-rod acts as a hinge in the drag part.

The drag can be freed of trash at once, as all the teeth are instantly raised by the separate connection of each cross hinge-rod with the lifting-arms.

We claim—

1. In a sulky-drag, the side arms, H H, pivoted to the cross-bar E, and provided with chains or ropes $f$, having branches $f'$ attached to each connecting-rod $o$ of the drag A, in combination with an armed lever, I $g\ g$, above the axle, substantially as described.

2. The flexible drag of bar-teeth $m\ m'$, connected and braced to each other and hinged to a draft-bar, F, substantially as described, in combination with the pole B, connected and braced to said front draft-bar and to the axle C, whereby the under drag is guided and kept steady with the carrying-frame.

3. A sulky-drag consisting of the vehicle having the steadying guide-pole B, the under draft-bar, F $d$, the vertical sleeved rods $a\ a\ a$, and the diagonal rods $c\ c\ c$, connected to and bracing the draft-bar, the drag proper, A, the pivoted side beams, H H, the branched chains $f f'$, connecting the several drag cross-rods $q$ with said arms and the armed lever I $g$, all constructed and arranged substantially as herein set forth.

In testimony that we claim the foregoing we have hereto affixed our signatures in the presence of two witnesses.

LADORE V. SIKES.
STILLMAN R. SIKES.

Witnesses:
OSCAR PERKINS,
MILLARD F. PAYNE.